United States Patent [19]
Nørholmen

[11] Patent Number: 6,113,312
[45] Date of Patent: Sep. 5, 2000

[54] LOCAL REMOTE OPERATED VEHICLE FOR INSTALLING ELONGATE ELEMENT ON SEABED

[75] Inventor: John Øivind Nørholmen, Lørenskog, Norway

[73] Assignee: Alcatel, Paris, France

[21] Appl. No.: 09/063,530

[22] Filed: Apr. 21, 1998

[30] Foreign Application Priority Data

Jun. 5, 1997 [NO] Norway .................................. 972555

[51] Int. Cl.[7] .............................. E03B 7/10; F16L 57/00
[52] U.S. Cl. ..................... 405/157; 405/158; 405/166; 114/312; 114/330
[58] Field of Search .................................. 405/157, 158, 405/166; 114/230.1, 144 B, 330, 312

[56] References Cited

U.S. PATENT DOCUMENTS

| | | | |
|---|---|---|---|
| 3,136,529 | 6/1964 | Dickinson et al. | 405/166 X |
| 3,576,977 | 5/1971 | Kolb | 405/166 X |
| 3,835,707 | 9/1974 | Rosa et al. | 73/291 |
| 3,996,794 | 12/1976 | Helgens, Jr. | 73/170 A |
| 4,037,189 | 7/1977 | Bell et al. | 340/6 R |
| 4,110,554 | 8/1978 | Moore et al. | 174/101.5 |
| 4,155,669 | 5/1979 | Rochelle | 405/158 |
| 4,164,379 | 8/1979 | Denman | 405/158 |
| 4,205,379 | 5/1980 | Fox et al. | 114/144 B X |
| 4,635,240 | 1/1987 | Geohegan, Jr. et al. | 367/89 |
| 4,721,055 | 1/1988 | Pado | 114/330 X |
| 4,796,238 | 1/1989 | Bourgeois et al. | 73/170 A X |
| 5,097,780 | 3/1992 | Winchester | 114/330 |
| 5,667,341 | 9/1997 | Kuehn | 405/228 |

FOREIGN PATENT DOCUMENTS 176686 of 0000 Norway .

*Primary Examiner*—Eileen D. Lillis
*Assistant Examiner*—Jong-Suk Lee
*Attorney, Agent, or Firm*—Ware, Fressola, Van der Sluys & Adolphson LLP

[57] ABSTRACT

A local remote operated vehicle for installing an elongated element (1)—such as a submarine cable—on a sea bed from a laying vessel or cable ship (2),—includes a guideweight/tracking gear (4) suspended from the ship and riding on the element (1). The gear (4) includes a garage (10) for hosting a local ROV (11) linked to the garage with a tether cable (12) long enough to enable the towed local ROV to monitor the element touchdown area (6).

6 Claims, 1 Drawing Sheet

LOCAL REMOTE OPERATED VEHICLE FOR INSTALLING ELONGATE ELEMENT ON SEABED

BACKGROUND OF THE INVENTION

1. Technical Field

The present invention relates to means for installing submarine cables or other elongated elements on a sea bed from a cable ship. A technical problem—in connection with subsea cable installations—is to monitor and make a record of the cable touchdown point in deep waters. Such records are required as documentation of a successful and reliable installation.

2. Description of the Prior Art

When installing cables in areas with low sea currents, a vertical plane can normally be placed through the cable axis from the pay out wheel on the ship to the touchdown point on the sea bed. In these cases it is easy to foresee and make a record of the touchdown point of the cable on the sea bed and the track along which the cable is laid and buried.

Depending on the weight and stiffness of the cable, and the depth of the waters, the sea currents can have considerable influence on the form of the curve followed by the cable on its way down to the sea bed. Instead of following a curve in one vertical plane, the curve can be three-dimensional. Difficulties will then arise when it is required to install the cable along a predetermined route on the sea bed.

Installation of cables on the sea bed is often assisted by ROV's (Remote Operated Vehicles) and/or divers, but when the sea currents are strong and the sea is deep such assistance will be very difficult if not impossible.

When the subsea currents are strong, —the best known solution to the problem is to monitor the touchdown point with an ROV operated from a separate surface vessel. Such a separate ROV solution results—however—in reduced laying speed and increased cost, especially with long cables.

In Norwagian Patent No. 176686 there is described means for determining the geographical coordinates of the touchdown of a cable during its installation by means of touchdown tracker gear. This gear—which rides on the cable a safe distance from the touchdown point during installation—is controlled from the cable ship by means of an umbilical cable. However, —experience has shown that in many cases it will not be possible to get close enough to see the touchdown point with this riding tracker gear.

SUMMARY OF THE INVENTION

The object of the present invention is therefore to improve installation methods in areas with strong sea currents.

With the present invention, a cable ship can be controlled to enable installation of a cable along a predetermined route on the sea bed and make reliable and continuous records of the seabed conditions along the route. The laying speed can be doubled as compared to the mentioned separate ROV solution, in deep waters.

The invention can be efficiently used in connection with the tracker gear of NO 176686 for heavy rigid cables, —and also in connection with guideweight gear used in connection with lightweight cables.

The present invention is much better and less expensive than the mentioned prior art. Towing the local ROV behind the guideweight/tracker gear simplifies the task of monitoring and recording the touchdown point. The local ROV which can be operated with a short tether cable can give reliable observations and records of the touchdown area, —even in deep waters. This is very important for the cable burial system.

BRIEF DESCRIPTION OF THE DRAWING

Above mentioned and other features and objects of the present invention will clearly appear from the following detailed description of embodiments of the invention taken in conjunction with the drawings, where FIG. 1 schematically illustrates cable laying and touchdown monitoring gear, and FIG. 2 in more detail illustrates the monitoring gear.

DETAILED DESCRIPTION OF THE INVENTION

Figures 1, 2:
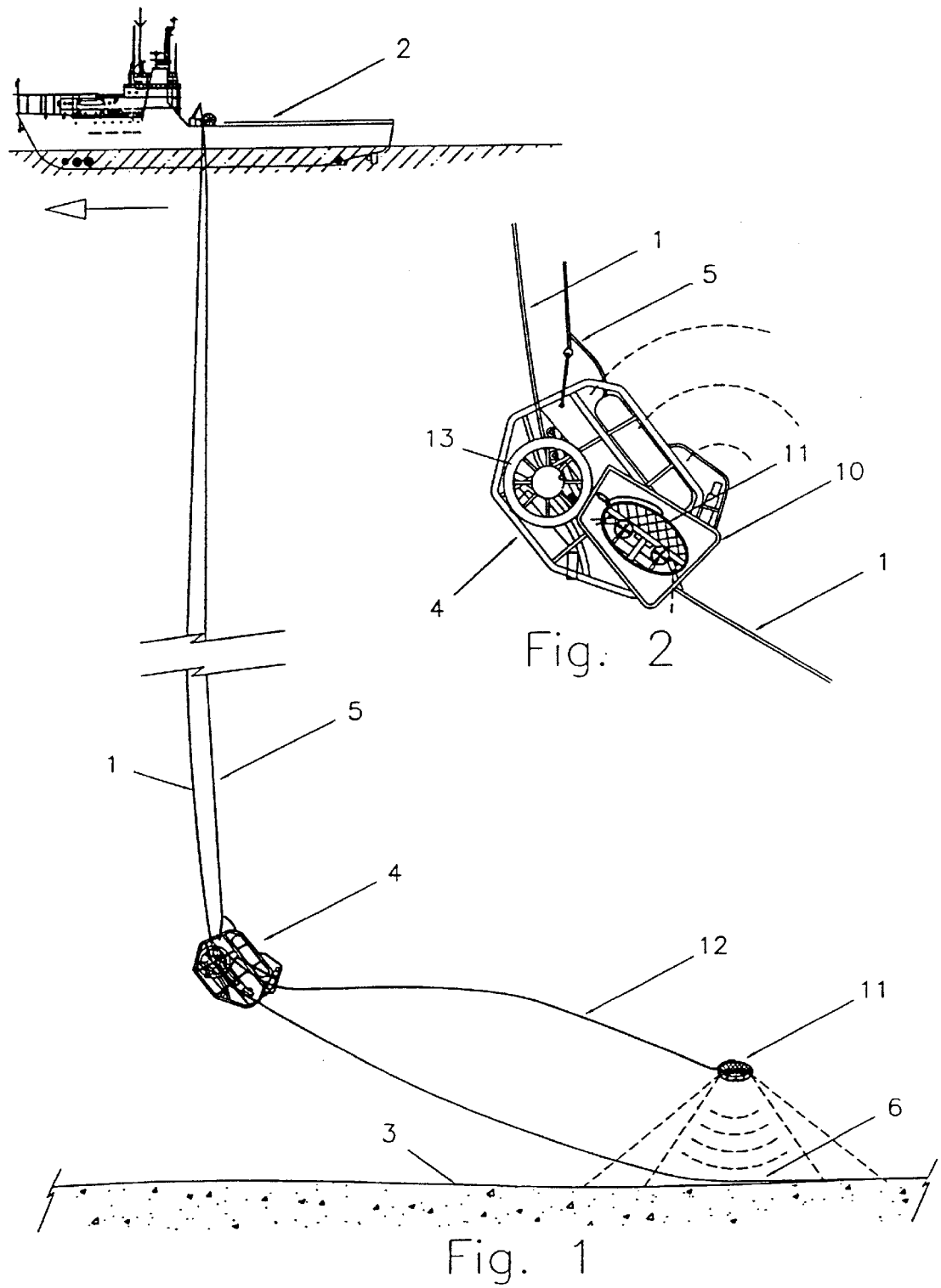

In FIG. 1 an elongated element 1 such as a lightweight cable is paid out from a cable ship 2 to be installed on a sea bed 3. The installation process is assisted with a guideweight 4 which is suspended and controlled from the cable ship 2 by means of a guideweight umbilical 5 in order to ensure sufficient longitudinal tension in the cable between the cable ship and the touchdown point 6 and avoid coiling of the cable on the sea bed. The guideweight gear 4 is designed to ride on the cable in somewhat the same way as the touchdown tracker gear described in NO 176686. The weights of these gears are designed in accordance with requirements concerned with the cable type, weight, rigidness, and the sea depth and sea currents.

The guideweight gear 4 should include sonars, altimeters and transponder/responder equipment.

The guideweight gear 4 (or alternatively the touchdown tracker gear) is —in accordance with the present invention provided with a garage 10 with a plug-in unit (FIG. 2) for a local ROV 11. This local ROV is controlled from the cable ship 2 via a tether cable 12 attached to the garage 10. The tether cable 12 can have positive buoyancy as illustrated in FIG. 1 in order to stay safely away from the element 1 under installation. The tether cable 12 can be reeled out and in with a winch arrangement 13 on the guideweight 4. The local ROV 11 can be maneuvered quite close to the touchdown point and as it is provided with light sources, cameras and auto-distance equipment the touchdown route can be recorded with great accuracy. Towing the local ROV behind the guideweight/tracker gear simplifies the task of monitoring and recording the touchdown point. If the local ROV should detect an undesirable touchdown area, the cable ship can be directed to avoid such area. The local ROV could probably be made to ride on the element 1 close to the touchdown but this includes a risk of touching the bottom. Tilting should be avoided.

The above detailed description of embodiments of this invention must be taken as examples only and should not be considered as limitations on the scope of protection.

What is claimed is:

1. A device for installing an elongated element on a sea bed from a laying cable ship, comprising a guideweight/tracking gear suspended from the ship and riding on the element, the gear includes garage means for hosting a local remote operated vehicle linked to said garage means with a tether cable long enough to enable the local remote operated vehicle to monitor the element as the element touches down on the sea bed wherein said garage means having a plug-in unit to receive said local remote operated vehicle.

2. The device according to claim 1, wherein said garage means includes a tether cable winch.

3. The device according to claim 1, wherein the tether cable has a positive buoyancy.

4. The device according to claim 1, wherein the gear and local remote operated vehicle are arranged to provide absolute geographical coordinates, or geographical coordinates relative to the immediate position of the ship, as well as information about element angles and tension.

5. The device according to claim 1, wherein the gear is arranged to provide absolute geographical coordinates, or geographical coordinates relative to the immediate position of the ship, as well as information about element angles and tension.

6. The device according to claim 1, wherein the local remote operated vehicle is arranged to provide absolute geographical coordinates, or geographical coordinates relative to the immediate position of the ship, as well as information about element angles and tension.

* * * * *